(12) United States Patent
Fujino

(10) Patent No.: US 7,697,023 B2
(45) Date of Patent: Apr. 13, 2010

(54) IMAGE FORMING APPARATUS

(75) Inventor: Hitoshi Fujino, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 755 days.

(21) Appl. No.: 11/521,514

(22) Filed: Sep. 15, 2006

(65) Prior Publication Data

US 2007/0064081 A1    Mar. 22, 2007

(30) Foreign Application Priority Data

Sep. 16, 2005   (JP)   ............................. 2005-270258

(51) Int. Cl.
*B41J 2/44*     (2006.01)
*G02B 26/10*   (2006.01)

(52) U.S. Cl. ...................................... 347/243

(58) Field of Classification Search ................. 347/233, 347/241, 243, 256, 258–261
See application file for complete search history.

(56) References Cited

U.S. PATENT DOCUMENTS

| | | | |
|---|---|---|---|
| 5,751,464 A | 5/1998 | Yoshikawa et al. | |
| 5,801,869 A | 9/1998 | Yoshikawa et al. | |
| 6,304,282 B1 | 10/2001 | Fujimoto | |
| 6,466,246 B2 | 10/2002 | Fujimoto | |
| 6,980,343 B2 | 12/2005 | Mori | |

FOREIGN PATENT DOCUMENTS

| | | |
|---|---|---|
| JP | 4-245214 | 9/1992 |
| JP | 8-220440 | 8/1996 |
| JP | 10-133130 | 5/1998 |
| JP | 11-242173 A | 9/1999 |
| JP | 2000-187173 | 7/2000 |
| JP | 2002-365572 | 12/2002 |
| JP | 2003-270573 A | 9/2003 |
| JP | 2005-134624 A | 5/2005 |

OTHER PUBLICATIONS

Computer-generated trasnslation of JP 2005-134624 cited in the IDS filed Mar. 19, 2009.*
Computer-generated translation of JP 2003-270573 cited in the IDS filed Mar. 19, 2009.*
Computer-generated translation of JP 11-242173 cited in the IDS filed Mar. 19, 2009.*
JP Office Action dtd Jan. 20, 2009 JP Appln. 2005-270258.

* cited by examiner

*Primary Examiner*—Huan H Tran
(74) *Attorney, Agent, or Firm*—Banner & Witcoff, Ltd.

(57) ABSTRACT

To provide an image forming apparatus suppressing color slippage without using a mirror with high flatness, when a reflective surface of the mirror used in an optical system of, for example, yellow is formed in a completely flat surface, and a curvature R of the reflective surface of the mirror used in the optical system of magenta is +75 m, a deviation of a scanning position exceeds 100 μm at maximum, resulting in accentuating the color slippage. Meanwhile, when the mirror of yellow is replaced with the mirror having the curvature R of +300 m, the slippage can be suppressed to 100 μm or less. Therefore, each mirror is selected, so that the curvature of each mirror becomes all positive or all negative. Thus, the deviation of the scanning position is in the same direction of laser beams L of each color, and the slippage can be prevented.

6 Claims, 8 Drawing Sheets

F I G. 6
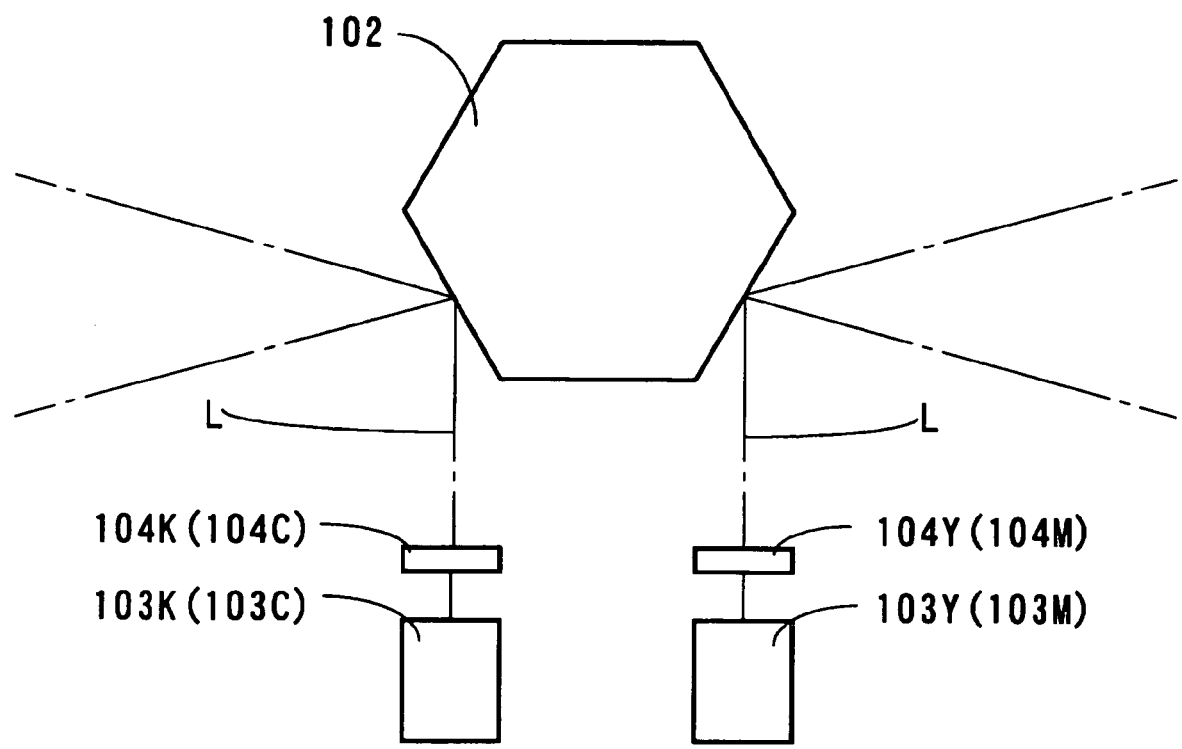

IMAGE FORMING APPARATUS

CROSS-REFERENCE OF RELATED APPLICATION

This Nonprovisional application claims priority under 35 U.S.C. §119(a) on patent application Ser. No. 2005-270258 in Japan on Sep. 16, 2005, the entire contents of which are hereby incorporated by reference.

BACKGROUND

The present invention relates to an image forming apparatus comprising a plurality of light beam sources and photoreceptors corresponding to each of the light beam sources, which forms images corresponding to electrostatic latent images formed on a surface of each photoreceptor on a recording medium in an overlaid state by exposure to plural light beams.

The image forming apparatus such as a laser printer, particularly a color image forming apparatus comprises a plurality of light beam sources, photoreceptors corresponding to each of the light beam sources, a deflecting part for deflecting light beams generated by each light beam source, mirror for guiding the light beams thus scanned to each photoreceptor corresponding to the light beam source, and at least one lens for imaging the light beams guided by the mirror on the surface of each photoreceptor. The image forming apparatus forms a color image by forming an electrostatic latent image on the surface of each photoreceptor by exposure to the light beams, developing the electrostatic latent image thus formed by sticking different colors of toner on the electrostatic latent image, transferring toner images thus formed on the photoreceptors to the recording medium so that the toner of different colors carried by the photoreceptors are transferred to a medium to be recorded in an overlaid state.

The image forming apparatus of this kind, for example, has four photoreceptors, and forms the color image on the medium to be recorded by sticking toner of yellow, magenta, cyan, and black on each photoreceptor, transferring the toner of different colors carried by the photoreceptors to a medium to be recorded in an overlaid state.

However, when the position (referred to as a scanning position hereafter) of the scanned and irradiated light beams on the photoreceptor is different between each photoreceptor because generation timing of the light beams is different between each light beam source in this kind of image forming apparatus, there is a possibility that the toner stuck on each photoreceptor is not overlaid on each other on the medium to be recorded at a desired positional relation, and so-called color slippage occurs. Therefore, it has been proposed that at least two pieces of plastic lenses out of the lenses respectively disposed on a light path from the light beam source to the photoreceptor are formed with the same cavity, thus reducing error of each light path (for example, see Japanese Patent Laid-Open No. 2000-187173).

BRIEF SUMMARY

However, in the aforementioned patent document, a curvature of mirror is not taken into consideration at all. Although a reflective surface of mirror needs to be a flat surface ideally, the reflective surface sometimes curves in an appearance of a projection or a recess to have a curvature. When the mirror has the curvature in a scanning direction, the mirror has a power (magnifying power) in the scanning direction.

In such a case, when the reflective surface of the mirror is formed in the projection or recess as described above, deviation of a scanning position occurs, in comparison with a case using a flat mirror. The color slippage of 100 μm or more can be recognized by human eyes. Therefore, when the deviation of the scanning position becomes remarkable, the color slippage is recognized in the image formed on the medium to be recorded.

However, the mirror with high flatness has a deteriorated productivity incurring a high cost, and therefore using the mirror with high flatness leads to an increase of cost of the image forming apparatus.

Therefore, an object is to provide the image forming apparatus capable of excellently preventing the color slippage from occurring, without using the mirror with high flatness.

In order to achieve the above-described object, there is provided an image forming apparatus according to an aspect, in which an electrostatic latent image is formed on a surface of a photoreceptor by exposure to light beams, the electrostatic latent image thus formed is developed by sticking toner on said electrostatic latent image, and said toner is transferred to a medium to be recorded for forming an image, comprising: a plurality of light beam sources; a deflecting part for deflecting a plurality of light beams generated by said plurality of light beam sources; a photoreceptor exposed to said plurality of light beams; a plurality of mirrors for guiding said plurality of light beams deflected by said deflecting part, each mirror guiding each light beam from said light beam sources to said photoreceptor; and at least one lens for imaging each light beam on the surface of said photoreceptor, wherein a curvature of a reflective surface of each mirror is respectively provided, so that a deviation of optical characteristic values of said plurality of mirrors on light paths between said plurality of light beam sources and said photoreceptor is within a predetermined range, and wherein curvatures of the reflective surfaces of said plurality of mirrors are all positive or all negative.

According to this structure, the curvature of the reflective surface of each mirror is selected (provided), so that the deviation of the optical characteristic values of the plurality of mirrors on the light paths between the plurality of light beam sources and the photoreceptor is within the predetermined range. Therefore, images corresponding to electrostatic latent images respectively formed on the photoreceptor can be formed on a medium to be recorded in an overlaid state, without largely deviating from each other. For example, when the curvature of the reflective surface of each mirror is selected (provided) so that the deviation of the scanning positions is settled to be under 100 μm, the color slippage can be preferably prevented from occurring without using the mirror with high flatness. It should be noted that the predetermined range is not limited to 100 μm, but is suitably set in accordance with characteristics required for the image forming apparatus.

Although various selection methods of the mirror according to the aspect can be considered, but at least one or more of the mirrors are respectively provided on each of the light paths, and curvature of the reflective surface of each mirror may be entirely positive or entirely negative. In this case, the error of the scanning position is generated in the same direction on any light path. Therefore, the deflection of the optical characteristic value is easily settled in the determined range.

According to the aforementioned aspect, the images corresponding to the electrostatic latent images respectively formed on the photoreceptor can be formed on the medium to be recorded in an overlaid state without largely deviating from each other.

The above and further objects and features of will more fully be apparent from the following detailed description with accompanying drawings.

BRIEF DESCRIPTION OF THE SEVERAL VIEWS OF THE DRAWINGS

FIG. 6 is a schematic plan view showing the constitution in the vicinity of the polygon mirror of the scanner unit;

DETAILED DESCRIPTION OF THE EXEMPLARY EMBODIMENTS

Embodiment 1

Figure 1:
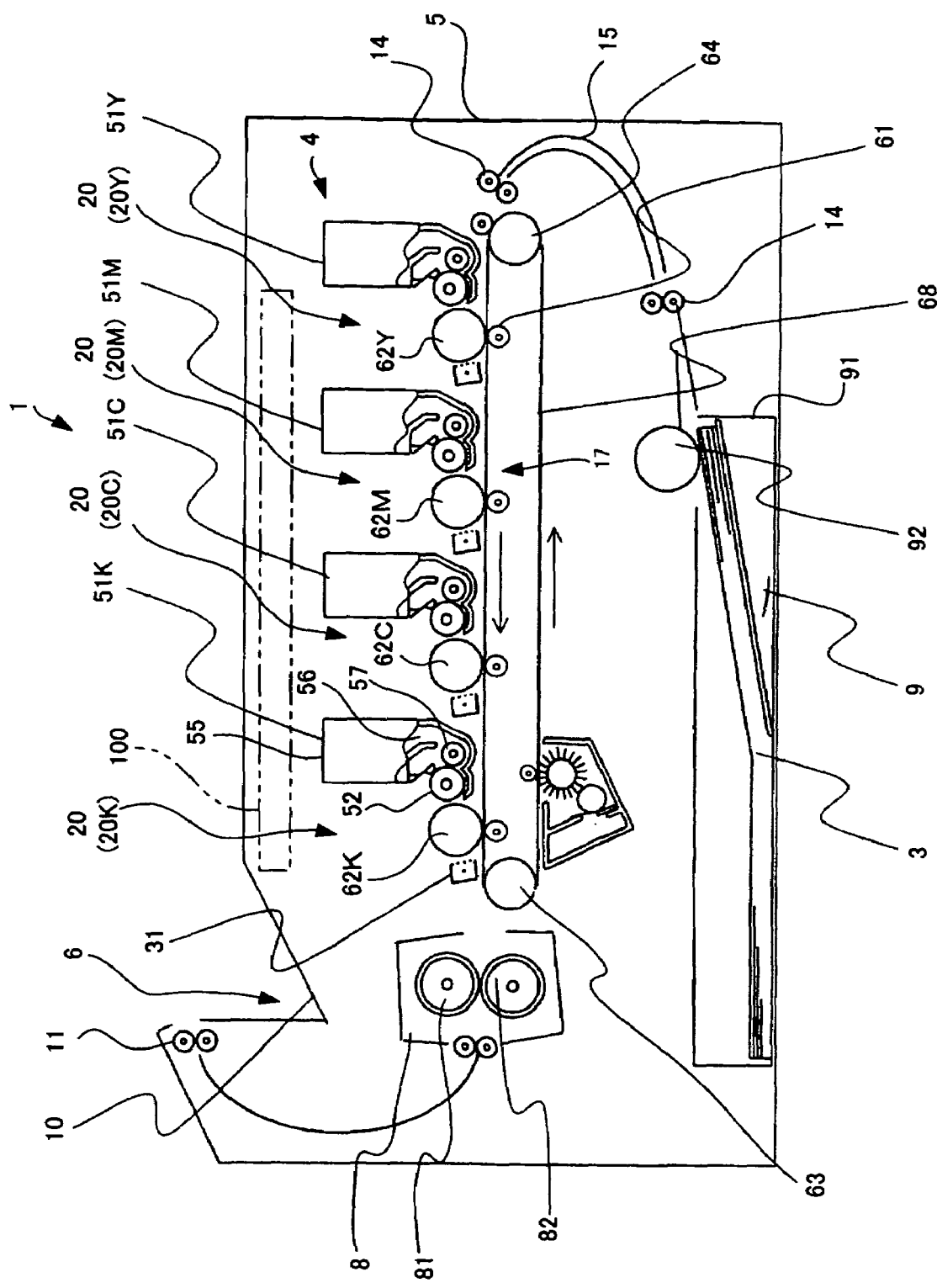
FIG. 1 is a schematic sectional view showing a constitution of a laser printer as an example of an image forming apparatus.

An embodiment will be explained based on the drawings hereafter. In FIG. 1, a printer 1 is a tandem-type color laser printer having four image forming units 20 as will be described later arranged horizontally in parallel with each other. A body casing 5 comprises a paper feeding section 9 for feeding recording sheet 3 as a medium to be recorded, an image forming section 4 for forming an image on the fed recording sheet 3, and a paper discharging section 6 for discharging the recording sheet 3 on which the image is formed.

The paper feeding section 9 has a paper feeding tray 91 installed removably from the front side (right side in FIG. 1) of the body casing 5, at a bottom portion in the body casing 5. Further, the paper feeding section 9 comprises a paper feeding roller 92 provided on a front upper side of the paper feeding tray 91, and carrying rollers 14 provided in an upper part of the paper feeding roller 92 and on a downstream side of the paper feeding roller 92 in the carrying direction of the recording sheet 3 (in some cases, the downstream side in the carrying direction of the recording sheet 3 is abbreviated to a downstream side, and an upstream side in the carrying direction of the recording sheet 3 is abbreviated to an upstream side).

Recording sheets 3 are stacked in the paper feeding tray 91. The recording sheets 3 in an uppermost part are sequentially fed toward the carrying rollers 14 by a rotation of the paper feeding roller 92, and the recording sheets 3 are sent from the carrying rollers 14 to a position (transfer position) between a carrying belt 68 and each photoreceptor drum 62.

In addition, a guide member 15 arranged in a vertical direction is provided between the paper feeding roller 92 and the carrying belt 68, and a pair of carrying rollers 14 are provided in each inlet and outlet of the guide member 15. By this structure, the recording sheets 3 fed by the paper feeding roller 92 are sent to the position between the carrying belt 69 and the photoreceptor drums 62 by the guide member 15.

In a middle portion of the body casing 5, the image forming section 4 comprises image forming units 20Y, 20M, 20C, 20K for forming an image, a transfer section 17 for transferring the image formed by each image forming unit 20 to the recording sheet 3, and a fixing section 8 for heating/pressuring the image transferred to the recording sheet 3 and fixing it to the recording sheet 3. Note that subscripts of the Y, M, C, K show each color of yellow (Y), magenta (M), cyan (C), and black (K). However, when they need not to be distinguished individually, the subscripts are omitted.

The image forming units 20Y, 20M, 20C, 20K comprises photoreceptor drums 62Y, 62M, 62C, 62K, respectively as photoreceptors. Each image forming unit 20 is constituted by disposing around each photoreceptor drum 62 an electrifier 31 for charging the photoreceptor drums 62, and a developing cartridge 51 as a developing part for sticking toner (developing agent) on the photoreceptor drums 62.

An electrifier 31 is an electrifier of Scorotron type for positive electrostatic charge for generating a corona discharge to uniformly charge the surfaces of the photoreceptor drums 62 to be positive in the polarity by corona discharge.

Moreover, in an upper part of four image forming units 20, a scanner unit 100 is disposed as an optical apparatus whereby the photoreceptor drums 62 are individually exposed to laser beams L (see FIG. 2) as light beams. The constitution of the scanner unit 100 will be described later in detail. Electrostatic latent images are formed on the surfaces of the photoreceptor drums 62 by an exposure to the laser beams L.

The developing cartridge 51 comprises a hopper 56, a feeding roller 57, and a developing roller 52 in a developing casing 55. The hopper 56 is formed as an internal space of the developing casing 55. Then, the toner of each color of yellow (Y), magenta (M), cyan (C), and black (K) is stored in the hopper 56, for each image forming unit 20.

Namely, the aforementioned four developing cartridges 51 are constituted of a developing cartridge 51Y having toner of yellow (Y) stored in the hopper 56, a developing cartridge 51M having toner of magenta (M) stored in the hopper 56, a developing cartridge 51C having toner of cyan (C) stored in the hopper 56, and a developing cartridge 51K having toner of black (K) stored in the hopper 56.

The feeding roller 57 is disposed on a lower direction of and obliquely backside of the hopper 56, and a metal roller shaft is covered with a roller portion composed of a conductive sponge member. The feeding roller 57 is rotatably supported so as to rotate in an opposite direction of the developing roller 52 in a nip section opposite to and in contact with the developing roller 52.

The developing roller 52 is rotatably disposed at a position opposite to and in contact with the feeding roller 57. The developing roller 52 is formed in such a manner that the metal roller shaft is covered with the roller portion composed of a conductive elastic member such as a rubber material.

Further, in the body casing 5, the transfer section 17 is provided so as to oppose to the photoreceptor drums 62 in an obliquely lower direction of the developing cartridges 51. The transfer section 17 comprises a carrying belt driving roller 63, a carrying belt driven roller 64, and a carrying belt 68 which is an endless belt bridged between the carrying belt driving roller 63 and the carrying belt driven roller 64, and transfer rollers 61.

The carrying belt driven roller 64 is disposed in front of the photoreceptor drum 62Y of the image forming unit 20Y on the uppermost stream side of the carrying direction of the recording sheets 3, and on an upper front side of the paper feeding roller 92. In addition, the carrying belt driving roller 63 is disposed in a rear direction of the photoreceptor drum 62K of the image forming unit 20K of black (K) arranged on the lowermost stream side in the carrying direction of the recording sheets 3, and in a lower direction of and obliquely front side of the fixing section 8. Also, the carrying belt 68 is disposed, with an outside surface being opposed to and in contact with all photoreceptor drums 62 of each image forming unit 20.

Then, by being driven by the carrying belt driving roller 63, the carrying belt driven roller 64 is driven accordingly, and the carrying belt 68 performs encircling movement between the carrying belt driving roller 63 and the carrying belt driven roller 64.

The transfer rollers 61 are disposed in the inside of the carrying belt 68 wound around the carrying belt driving roller 63 and the carrying belt driven roller 64, so as to adjacent to and face the photoreceptor drums 62 of each image forming unit 20 through the carrying belt 68. The transfer rollers 61 are formed in such a way that the metal roller shaft is covered with the roller portion composed of a conductive elastic member such as a rubber material.

In addition, the transfer rollers 61 are rotatably provided in a counterclockwise direction, so as to rotate in the same direction as an encircling movement direction of the carrying belt 68, in a contact face opposed to and in contact with the carrying belt 68. During transfer, a suitable transfer bias is applied between the transfer rollers 61 and the photoreceptor drums 62 so controlled as to have constant current in a direction of transferring the toner stuck on the surfaces of the photoreceptor drums 62 to the recording sheets 3.

The fixing section 8 is disposed in the rear direction of the image forming unit 20 and the transfer section 17, and on the downstream side in the carrying direction. The fixing section 8 has a heat roller 81 and a pressure roller 82. The heat roller 81 is composed of a metal element pipe having a separative layer formed on its surface, and has a halogen lamp internally installed along its axial direction. Then, by the halogen lamp, the surface of the heat roller 81 is heated to a fixed temperature. Also, the pressure roller 82 is disposed so as to press the heat roller 81.

Moreover, the paper discharge section 6 is disposed on the downstream side in the carrying direction of the fixing section 8, in the upper part of the body casing 5. Then, disposed in the paper discharge section 6 are a pair of paper discharge rollers 11 for discharging the recording sheets 3, on which the image is already fixed, to a paper discharge tray 10, and the paper discharge tray 10 disposed on the downstream side of the paper discharge roller 11 on which the recording sheets 3 already passed through all the image forming steps are accumulated.

Figure 2:
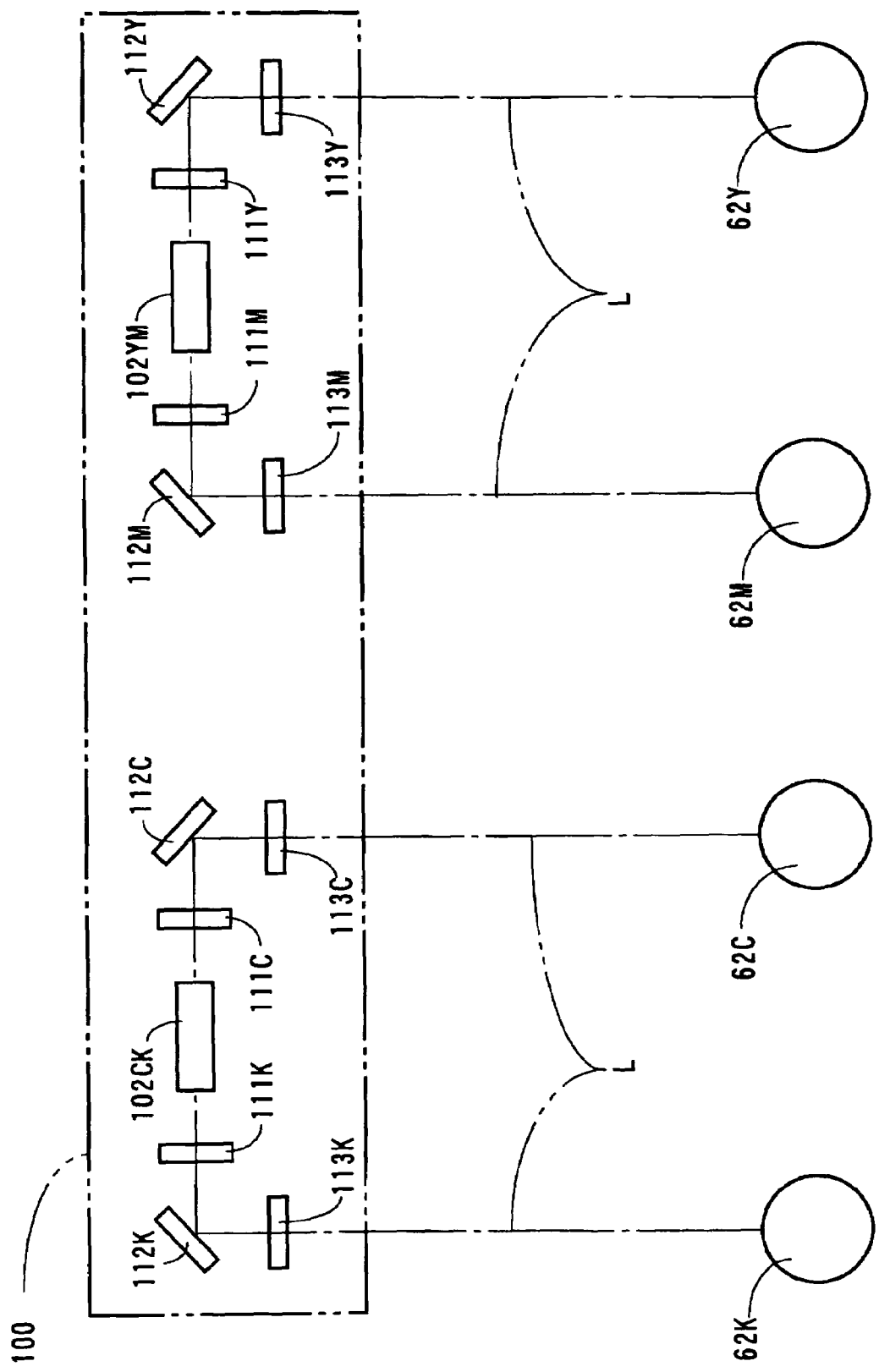
FIG. 2 is a schematic sectional view showing the constitution of a scanner unit of the printer.

Next, FIG. 2 is a sectional view showing a schematic constitution of the scanner unit 100. As shown in FIG. 2, the scanner unit 100 has a polygon mirror 102YM as a deflecting part for deflecting laser beams L as light beams to which the photoreceptor drums 62Y and 62M as photoreceptors are exposed, and a polygon mirror 102CK as a deflecting part for deflecting the laser beams L as light beams to which the photoreceptor drums 62C and 62K are exposed.

Figure 3:
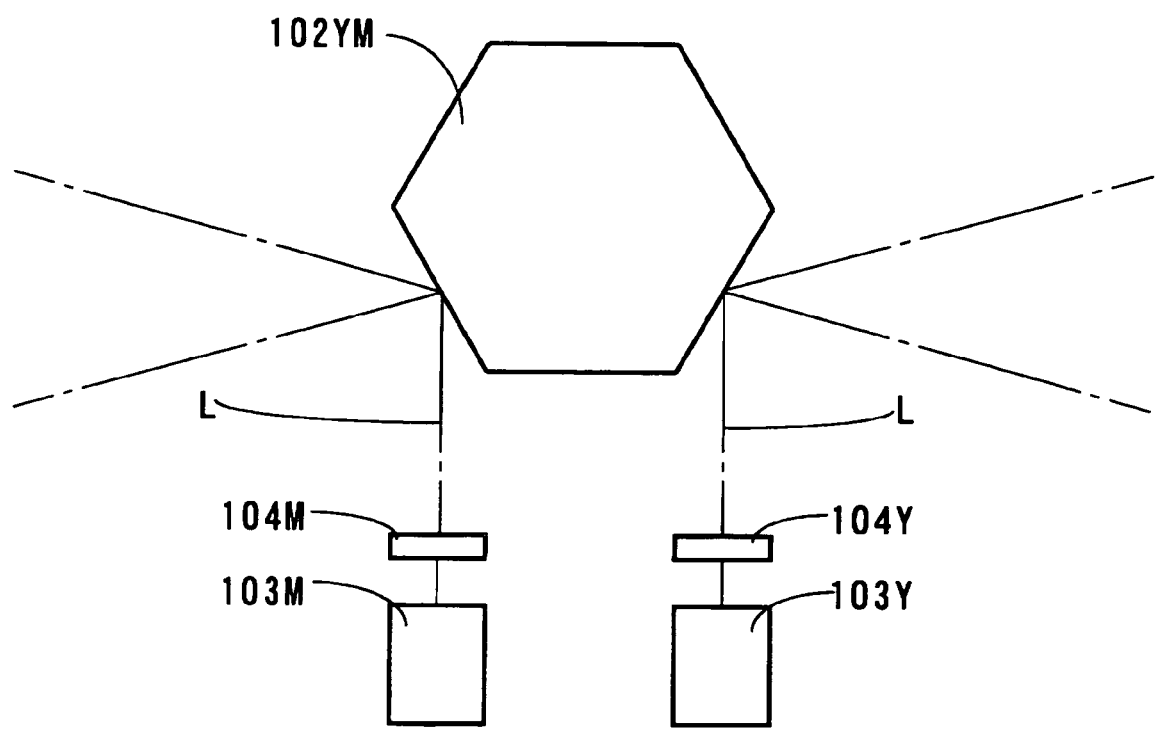
FIG. 3 is a schematic plan view showing the constitution in the vicinity of a polygon mirror of the scanner unit.

FIG. 3 is a plan view showing the constitution in the vicinity of the polygon mirror 102YM out of these polygon mirrors. As shown in FIG. 3, semiconductor lasers 103Y and 103M as light beam sources are provided in the vicinity of the polygon mirror 102YM to generate and emit the laser beams L as light beams. Collimate lenses 104Y and 104M, whereby divergent light beams emitted from each of the semiconductor lasers 103Y and 103M are made to be collimated lights, are provided in the vicinity of the polygon mirror 102YM. The light beam source may be constituted of not only the semiconductor lasers 103Y and 103M but also the collimate lenses 104Y and 104M.

The semiconductor lasers 103Y and 103M emit laser beams L individually in a timing in accordance with image data of each color of yellow (Y) and magenta (M). Different planes of the polygon mirror 102YM are irradiated with the laser beam L emitted from the semiconductor laser 103Y and passed through the collimate lens 104Y, and the laser beam L emitted from the semiconductor laser 103M and passed through the collimate lens 104M. The respective laser beams L are reflected in a direction opposite to each other by about 180°. The place in the vicinity of the polygon mirror 102CK is similarly constituted, and the laser beams L corresponding to cyan (C) and black (K) are reflected in the direction opposite to each other by about 180°. In addition, although not shown, the laser beam L is converted into approximately a collimated light flux by the collimate lens 104, restricted by diaphragm openings not shown, and further converged by a cylindrical lens not shown. Then, the reflective surfaces of the polygon mirrors 102YM and 102CK are irradiated with the laser beams L.

An explanation is returned to FIG. 2. The scanner unit 100 further comprises fθ lenses 111Y, 111M, 111C, and 111K to mainly perform an fθ compensation, cylindrical lenses 113Y, 113M, 113C, and 113K to mainly perform a plane tilt compensation, and flat-shaped mirrors 112Y, 112M, 112C, and 112K to turn back the laser beams L. The laser beam L corresponding to yellow (Y) reflected by the polygon mirror 102YM, passes through the fθ lens 111Y, and is reflected (guided) by the mirror 112Y, then passes through the cylindrical lens 113Y, and reaches the photoreceptor drum 62Y to be imaged thereon.

Also, the laser beam L corresponding to magenta (M) reflected (guided) by the polygon mirror 102YM and the laser beam L corresponding to cyan (C) or black (K) reflected by the polygon mirror 102CK similarly reach the photoreceptor drums 62M, 62C, and 62K to be imaged thereon after sequentially passing through the fθ lenses 111M, 111C, 111K, mirrors 112M, 112C, 112K, and cylindrical lenses 113M, 113C, 113K.

Figure 4:
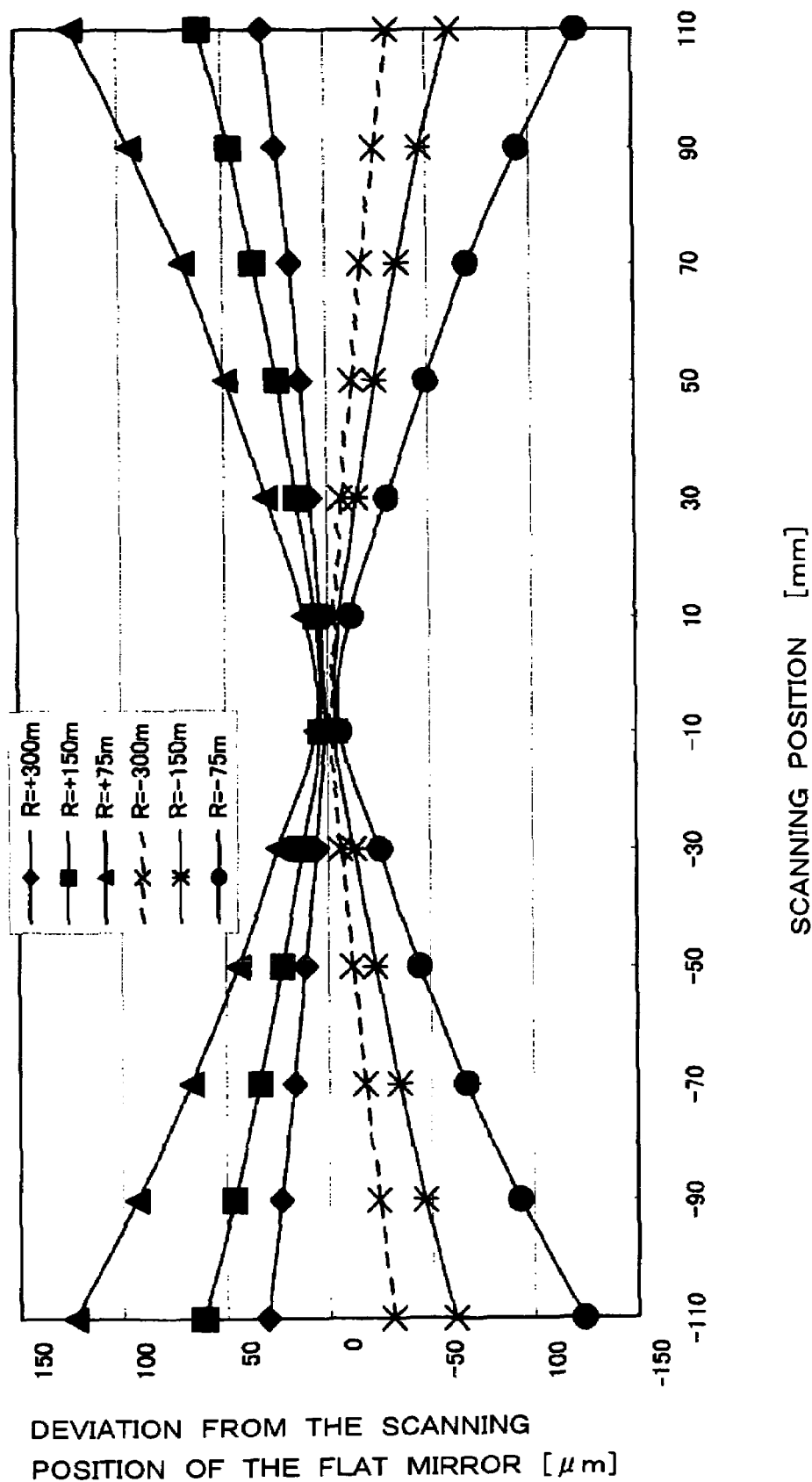
FIG. 4 is a graph showing a corresponding relation between a deviation from a scanning position of a flat folding-back mirror and the scanning position, with respect to each kind of curvature of the mirror.

In the scanner unit 100 thus constituted, when the reflective surface of the mirror 112 has a curvature R, a deviation of a scanning position occurs, compared to a case in which the reflective surface of the mirror 112 has a completely flat surface. FIG. 4 is a graph showing the corresponding relation between the deviation thus occurs (deviation from the scanning position of the flat folding-back mirror) and the scanning position.

As is clarified from the graph, for example, when the reflective surface of the mirror 112Y is formed in a completely flat surface and the curvature R of the reflective surface of the mirror 112M is +75 m, the deviation of the scanning position exceeds 100 μm at maximum, resulting in accentuating a color slippage state. Meanwhile, when the mirror 112Y is replaced with the mirror having the curvature of +300 m, the color slippage can be suppressed to 100 μm or less. Note that in this embodiment, the curvature R in the case of a projected reflective surface is expressed by +, and the curvature R in the case of a recessed reflective surface is expressed by −.

Therefore, according to this embodiment, the curvature of a stock mirror is measured by an autocollimator, and each of the mirrors 112Y, 112M, 112C, 112K is selected, so that curvatures of the reflective surfaces become all positive or all negative. Thus, the deviation of the scanning position occurs in the same direction, on any light path of the laser beam L of each color, and it becomes possible to excellently prevent the color slippage from occurring without using the mirror with high flatness.

Embodiment 2

Figure 5:
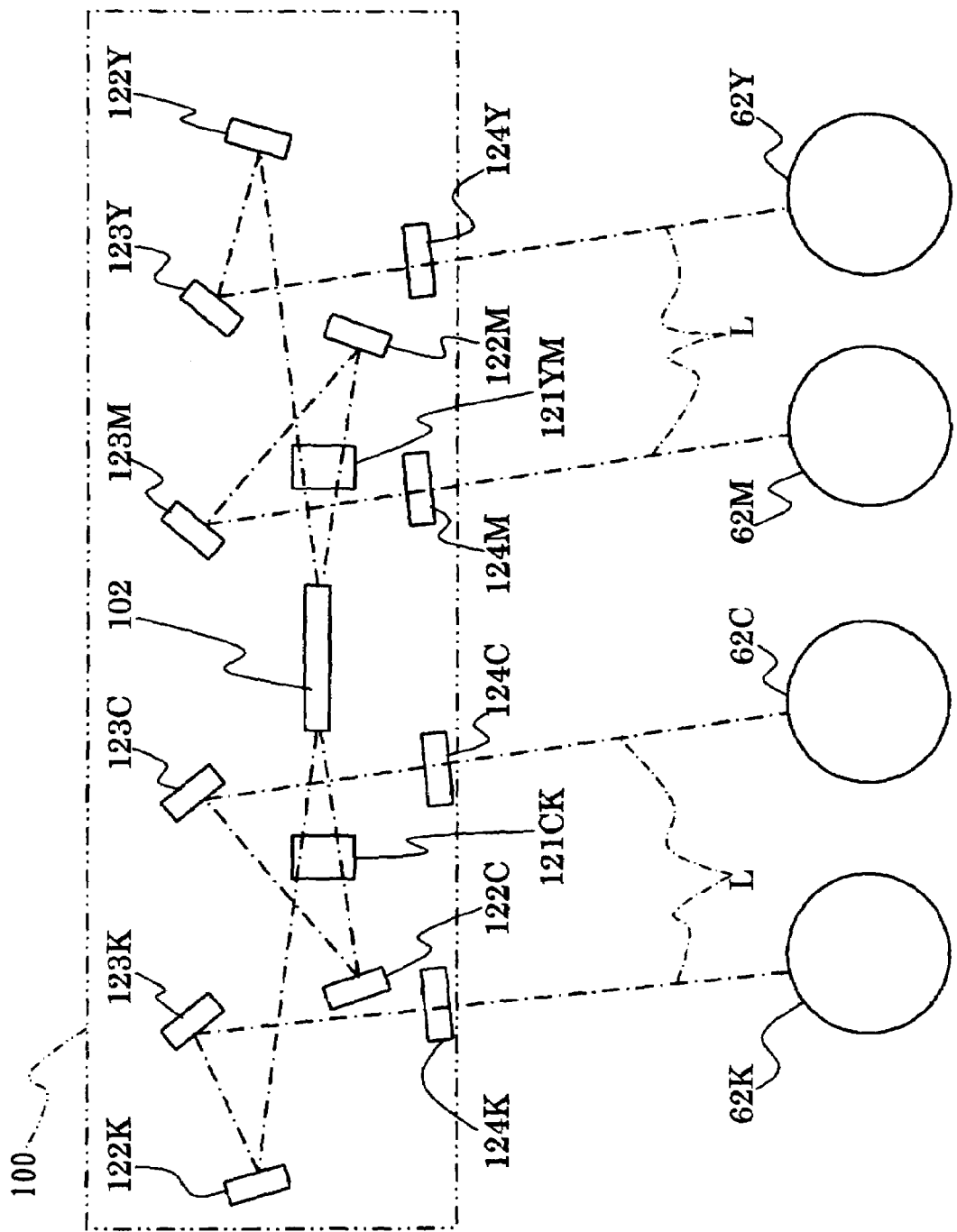
FIG. 5 is a schematic sectional view showing the constitution of other embodiment of the scanner unit.

FIG. 5 is a sectional view showing the scanner unit 100 according to other embodiment. In this embodiment, the scanner unit 100 comprises only one polygon mirror 102 for scanning the laser beams L to which the photoreceptor drums 62Y, 62M, 62C, 62K are exposed. The place in the vicinity of the polygon mirror 102 has approximately the same constitution as the constitution shown in the embodiment 1 shown in FIG. 3. A different point is that, as shown in FIG. 6, the semiconductor laser 103Y and the collimate lens 104Y corresponding to yellow (Y) and the semiconductor laser 103M and the collimate lens 104M corresponding to magenta (M) are arranged in an overlaid state, and the semiconductor laser 103K and the collimate lens 104K corresponding to black (K) and the semiconductor laser 103C and the collimate lens 104C corresponding to cyan (C) are arranged in an overlaid state.

The laser beams L emitted from the semiconductor lasers 103Y and 103M are emitted to a common reflective surface of the polygon mirror 102 at different incident angles, and as shown in FIG. 5, reflected at different angles. The laser beams L emitted from the semiconductor lasers 103K and 103C are also emitted to other common reflective surface of the polygon mirror 102 at different incident angles and, as shown in FIG. 5, reflected at different angles. Also, the laser beams L corresponding to cyan (C) or black (K) are reflected in the direction opposed to the laser beams L corresponding to yellow (Y) or magenta (M) by about 180°.

As shown in FIG. 5, the laser beam L corresponding to yellow (Y) or magenta (M) passes through the common fθ lens 121YM. Thereafter, the laser beam L corresponding to yellow (Y) is sequentially reflected by the mirrors 122Y and 123Y, passes through the cylindrical lens 124Y, and reaches the photoreceptor drum 62Y. The laser beam L corresponding to magenta (M) passes through the fθ lens 121YM, thereafter is sequentially reflected by the mirrors 122M and 123M, then passes through the cylindrical lens 124M, and reaches the photoreceptor drum 62M. Similarly, the laser beam L corresponding to cyan (C) or black (K) passes through the common fθ lens 121CK, thereafter is sequentially reflected by the mirror 122C or 122K, mirror 123C or 123K, then passes through the cylindrical lens 124C or 124K, and reaches the photoreceptor drum 62C or 62K.

Figure 7:
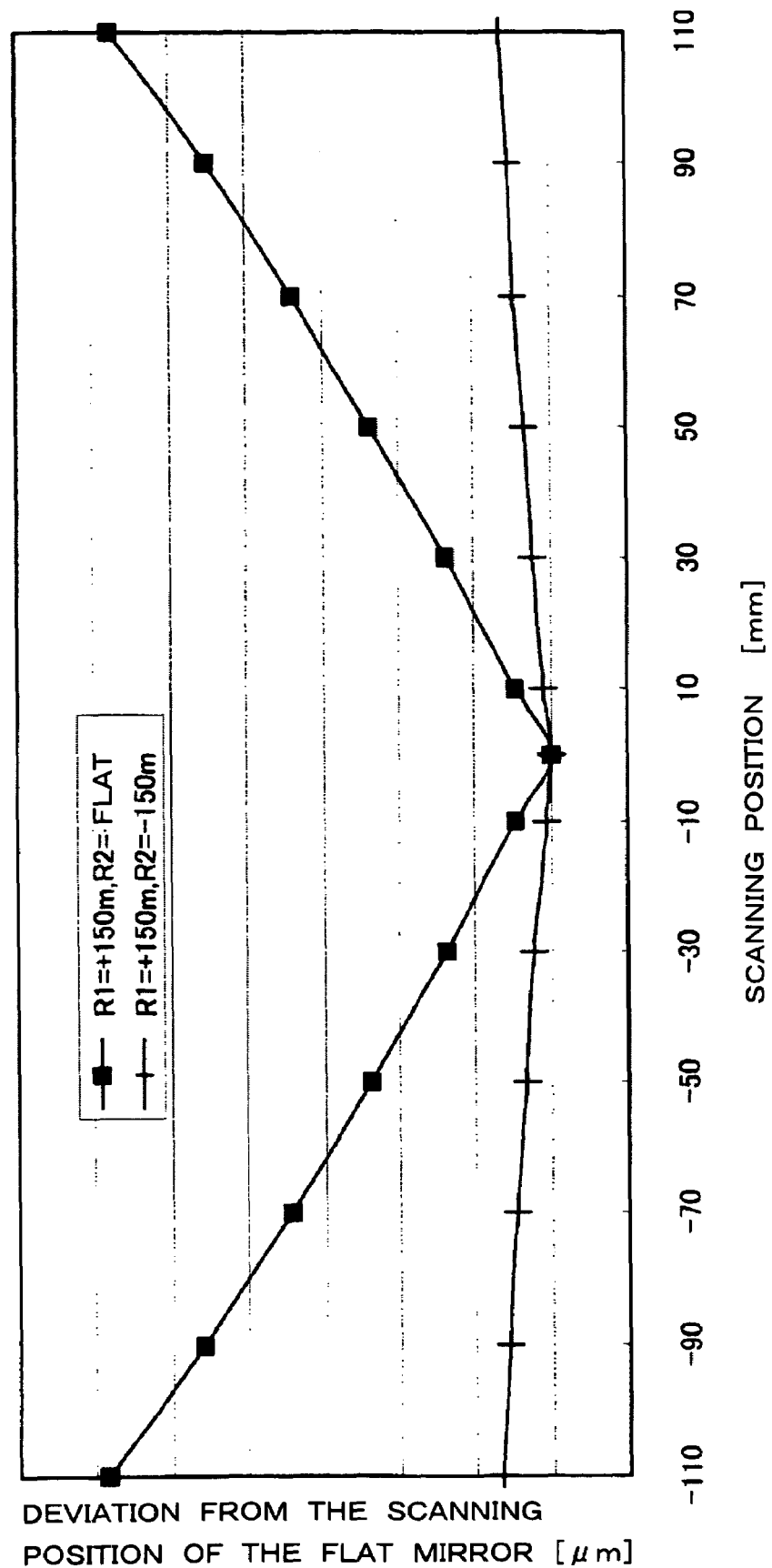
FIG. 7 is a graph showing the corresponding relation between the deviation from the scanning position of the flat folding-back mirror and the scanning position, with respect to a combination of curvatures of the mirror.

In the scanner unit 100 thus constituted, a plurality of mirrors are provided on each light path of the laser beams L. Therefore, by using the curvature with a positive mirror and a negative mirror in combination, the deviation of the scanning position can be suppressed. FIG. 7 is a graph showing the corresponding relation between a deviation amount (deviation from the scanning position of the flat folding-back mirror) of the scanning position and the scanning position when the reflective surfaces of two mirrors 122 and 123 are formed in completely flat surfaces, with respect to various combinations of curvature R1 of the mirror 122 and curvature R2 of the mirror 123. When the curvature R1 of the mirror 122 has the curvature R1 of +150 m and the mirror 123 is formed in a completely flat surface, the deviation of the scanning position exceeds 100 μm at maximum, resulting in accentuating the color slippage state. Meanwhile, when the mirror 123 is replaced with the mirror having the curvature R2 of −150 m, with the mirror 122 having the curvature R1 of +150 m remained as it is, the color slippage can be suppressed to 20 μm or less.

Therefore, in this embodiment, the curvature of the stock mirror is measured by the autocollimator, and the curvatures of the reflective surfaces of the mirrors 122 and 123 on each light path of the laser beams L are set to the combination of positive and negative, respectively. Thus, the deviation of the scanning position due to the curvatures of the mirrors 122 and 123 is canceled, thus making it possible to excellently control the generation of the color slippage without using the mirror with high flatness.

In this way, according to each of the aforementioned embodiments, the generation of the color slippage can be excellently prevented, without using the mirror with high flatness. Accordingly, the picture quality can be excellently improved without increasing a manufacturing cost of the printer 1.

It should be noted that, for example, the polygon mirror may be provided for each color one by one, or reversely, not only the polygon mirror but also the fθ lens may be used commonly in each color.

Embodiment 3

Figure 8:
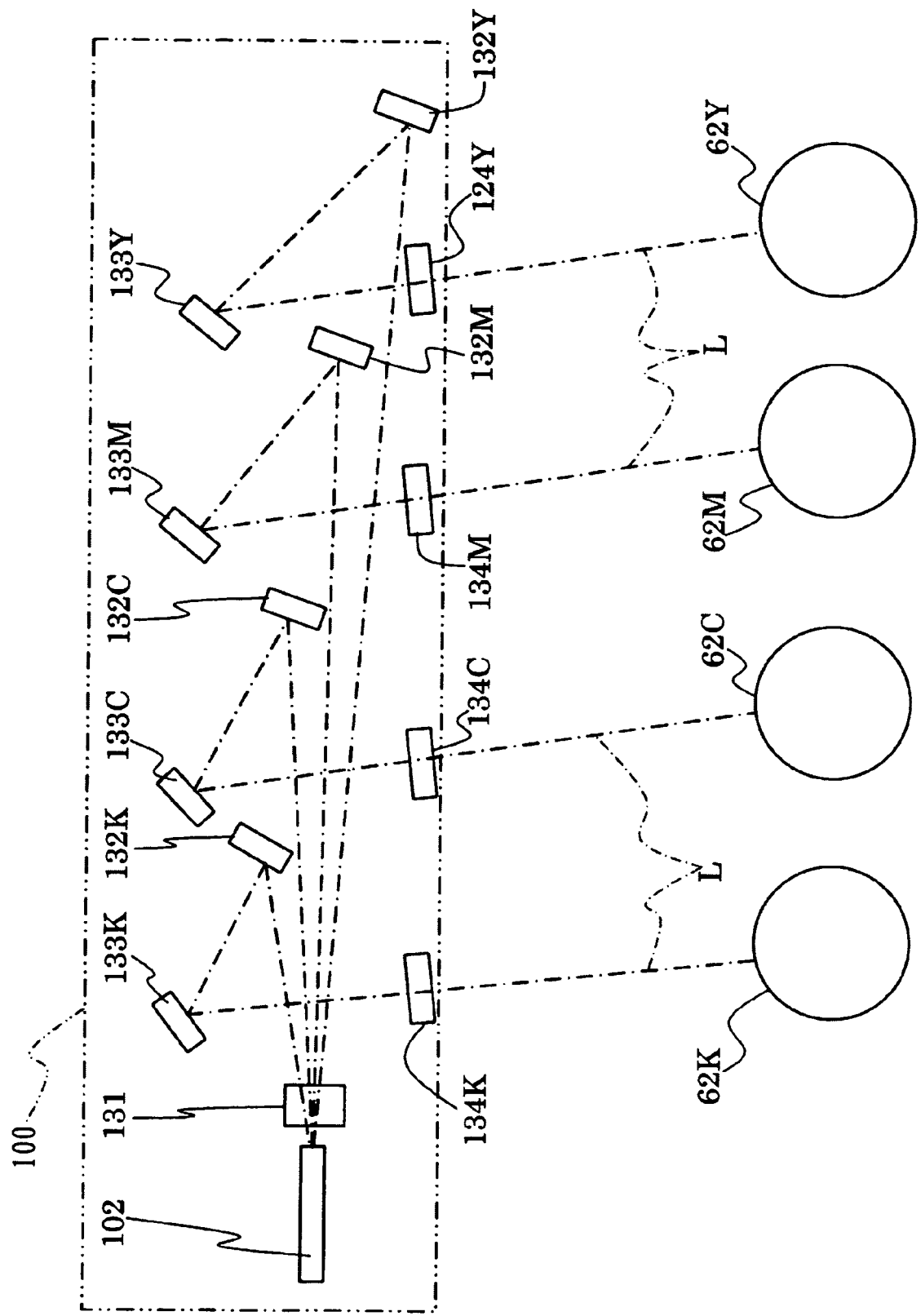
FIG. 8 is a schematic sectional view showing the constitution of further other embodiment of the scanner unit.

FIG. 8 is a sectional view showing a schematic constitution of an embodiment wherein a polygon mirror 102 and an fθ lens 131 are used commonly in each color. According to this embodiment, a common reflective surface of the polygon mirror 102 is irradiated with four laser beams L corresponding to each color at different incident angles, from four overlapped semiconductor lasers and collimate lenses (not shown).

The laser beams L corresponding to each color are reflected by the aforementioned reflective surface of the polygon mirror 102 at different angles, and passed through a common fθ lens 131. Thereafter, the laser beams L corresponding to yellow (Y) are sequentially reflected by mirrors 132Y and 133Y, pass through a cylindrical lens 134Y, and reach the photoreceptor drum 62Y. The laser beams L corresponding to magenta (M) pass through the fθ lens 131, then are sequentially reflected by mirrors 132M and 133M, then pass through a cylindrical lens 134M, and reach the photoreceptor drum 62M. In the same way, the laser beams L corresponding to cyan (C) and black (K) pass through the aforementioned common fθ lens 131, then are sequentially reflected by a mirror 132C or 132K, mirror 133C or 133K, then pass through a cylindrical lens 134C or 134K, and reach the photoreceptor drum 62C or 62K.

In this case also, by setting the curvatures of the reflective surfaces of the mirrors 132 and 133 on each light path of the laser beams L, to the combination of positive and negative, respectively, the deviation of the scanning position due to the curvatures of the mirrors 132 and 133 can be canceled, and in addition, the generation of the color slippage can be excellently prevented without using the mirror with high flatness.

Also, in the aforementioned each embodiment, an identification mark, which is readable with an external device, such as a barcode and an RFID tag showing the curvature of the mirror may be provided in each mirror. In this case, when a sensor, as the external device, such as a barcode reader and an RFID tag reader is provided in a manufacturing line, the combination of a suitable mirror can be automatically found by reading the identification mark by such a sensor or the like. Further, in the aforementioned each embodiment, only positive and negative are taken into consideration for the curvature of the reflective surface of the mirror, but the color slippage can be further excellently prevented when the numerical value of the curvature is also taken into consideration. Also, in the aforementioned each embodiment, only the curvature of a main scanning direction is taken into consideration, but the curvature of a sub-scanning direction may also be taken into consideration.

Still further, this can be applied to various image forming apparatuses such as a facsimile apparatus and a copying machine other than the printer, and the photoreceptor may be formed in a belt-like shape. Note that in the aforementioned embodiments, the photoreceptor drum 62 corresponds to the photoreceptor, the semiconductor laser 103 corresponds to a laser generating part, and polygon mirror 102 corresponds to a deflection part, respectively.

As this description may be embodied in several forms without departing from the spirit of essential characteristics thereof, the present embodiments are therefore illustrative and not restrictive, since the scope is defined by the appended claims rather than by description preceding them, and all changes that fall within metes and bounds of the claims, or equivalence of such metes and bounds thereof are therefore intended to be embraced by the claims.

What is claimed is:

1. An image forming apparatus, in which an electrostatic latent image is formed on a surface of a photoreceptor by exposure to light beams, the electrostatic latent image thus formed is developed by sticking toner on said electrostatic latent image, and said toner is transferred to a medium to be recorded for forming an image, comprising:
   a plurality of light beam sources;
   a deflecting part for deflecting a plurality of light beams generated by said plurality of light beam sources;
   at least one photoreceptor exposed to said plurality of light beams;
   a plurality of mirrors for guiding said plurality of light beams deflected by said deflecting part, each mirror guiding each light beam from said light beam sources to said at least one photoreceptor; and
   at least one lens for imaging each light beam on the surface of said at least one photoreceptor,
   wherein a curvature of a reflective surface of each mirror is respectively provided, so that a deviation of optical characteristic values of said plurality of mirrors on light paths between said plurality of light beam sources and said at least one photoreceptor is within a predetermined range, and
   wherein curvatures of the reflective surfaces of said plurality of mirrors are all positive or all negative.

2. The image forming apparatus according to claim 1, wherein an identification mark showing positive and negative curvature of the reflective surface is provided in each mirror.

3. The image forming apparatus according to claim 2, wherein said identification mark is readable by an external device.

4. An image forming apparatus, in which an electrostatic latent image is formed on a surface of a photoreceptor by exposure to light beams, the electrostatic latent image thus formed is developed by sticking toner on said electrostatic latent image, and said toner is transferred to a medium to be recorded for forming an image, comprising:
   a plurality of light beam sources;
   a deflecting part for deflecting a plurality of light beams generated by said plurality of light beam sources;
   at least one photoreceptor exposed to said plurality of light beams;
   a plurality of mirrors for guiding said plurality of light beams deflected by said deflecting part, each mirror guiding each light beam from said light beam sources to said at least one photoreceptor, and a plurality of mirrors being provided on each of light paths between said plurality of light beam sources and said at least one photoreceptor; and
   at least one lens for imaging each light beam on the surface of said at least one photoreceptor,
   wherein a curvature of a reflective surface of each mirror is respectively provided, so that a deviation of optical characteristic values of said plurality of mirrors is within a predetermined range,
   wherein said plurality of mirrors provided on each of at least two of said light paths are constituted by combinations of positive and negative curvatures of reflective surfaces and
   wherein an identification mark showing positive and negative curvature of the reflective surface is provided in each mirror.

5. The image forming apparatus according to claim 4, wherein said identification mark is readable by an external device.

6. An image forming apparatus, in which an electrostatic latent image is formed on a surface of a photoreceptor by exposure to light beams, the electrostatic latent image thus formed is developed by sticking toner to said electrostatic latent image, and said toner is transferred to a medium to be recorded for forming an image, comprising:
   a plurality of light beam sources;
   a deflecting part for deflecting a plurality of light beams generated by said plurality of light beam sources;
   at least one photoreceptor exposed to said plurality of light beams;
   a plurality of mirrors for guiding said plurality of light beams deflected by said deflecting part, each mirror guiding each light beam from said light beam sources to said at least one photoreceptor; and
   at least one lens for imaging each light beam on the surface of said at least one photoreceptor,
   wherein a curvature of a reflective surface of each mirror is respectively provided, so that a deviation of optical characteristic values related to each light path between said plurality of light beam sources and said at least one photoreceptor is within a predetermined range, and
   wherein curvatures of the reflective surfaces of said plurality of mirrors are all positive or all negative.

* * * * *